May 30, 1939.   A. P. CHESTER   2,160,125
OVEN CONTROL
Filed April 18, 1936   3 Sheets-Sheet 1

INVENTOR.
ALDEN P. CHESTER.
BY
Lockwood Goldsmith & Galt
ATTORNEYS.

May 30, 1939.　　　　A. P. CHESTER　　　　2,160,125
OVEN CONTROL
Filed April 18, 1936　　　　3 Sheets-Sheet 2
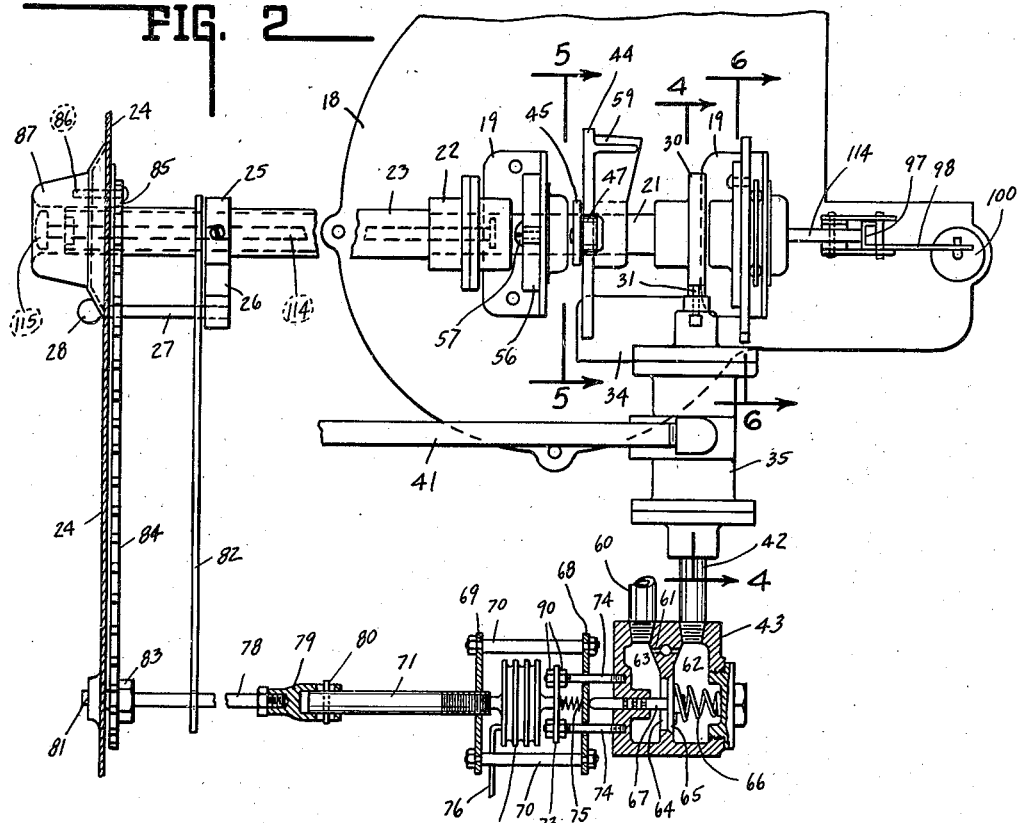
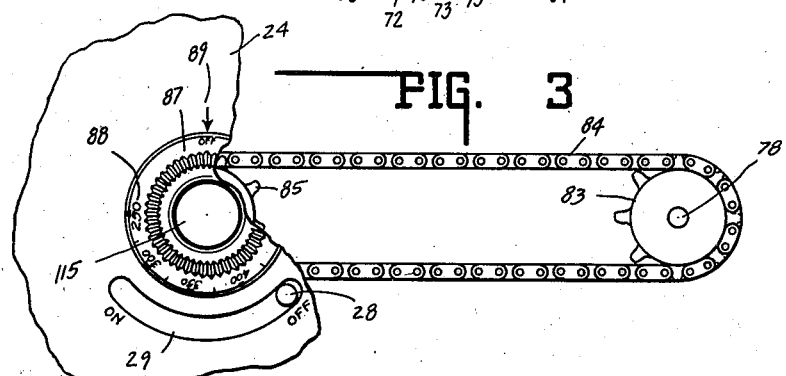
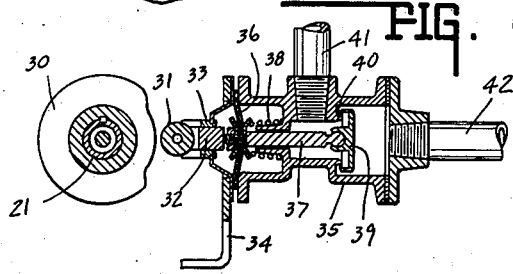
INVENTOR.
ALDEN P. CHESTER.
BY
Lockwood Goldsmith & Galt
ATTORNEYS.

May 30, 1939. A. P. CHESTER 2,160,125
OVEN CONTROL
Filed April 18, 1936 3 Sheets-Sheet 3

INVENTOR.
ALDEN P. CHESTER.
BY
ATTORNEYS.

Patented May 30, 1939

2,160,125

UNITED STATES PATENT OFFICE 2,160,125

OVEN CONTROL

Alden P. Chester, Kokomo, Ind., assignor to Globe American Corporation, Kokomo, Ind., a corporation Application April 18, 1936, Serial No. 75,146

1 Claim. (Cl. 236—46)

This invention relates to an oven control of the general type in which it is desired to supply heat to the oven through a certain period and thereafter to shut off the supply of heat and the circulation of air about or through the oven and to continue cooking on retained heat. In this type of control, it is important that both the time of heat supply and the rate of heat supply be accurately controlled in order to produce uniform cooking results. For example, if the heat is supplied at a given rate but the time before the heat supply is shut off is not accurately controlled, the cooking results will vary with the time. This is due to the fact that all cooking operations are chemical processes which require certain definite time for the completion of the reactions.

One object of this invention is to provide an oven control in which both the time and rate of fuel supply are accurately measured. To this end there is provided a thermostatically controlled valve designed to control the admission of fuel to maintain a predetermined oven temperature after the oven has been heated, combined with a second valve arranged to shut off the heat supply at the end of a predetermined time. Operating with the second mentioned valve there is a vent closure which shuts off the circulation of products of combustion at the same time the fuel supply is stopped. This effectively retains a large amount of heat in the oven and permits the same to continue cooking on the retained heat for a considerable length of time. The time of cooking on retained heat is, of course, dependent on the temperature within the oven at the time of fuel shutoff and may be accurately determined by setting the thermostatic valve to maintain the necessary temperature prior to shutoff.

Preferably, the stoppage of fuel supply and closure of the vent are automatically controlled by a timing mechanism. Means are provided, however, for manually operating the same. The timing mechanism may then be arranged to sound an alarm indicating when the desired time of fuel supply has elapsed and the shutoff apparatus may then be manually operated.

Other objects and features of the invention will be understood from the accompanying drawings and the following description and claim.

Figure 1:
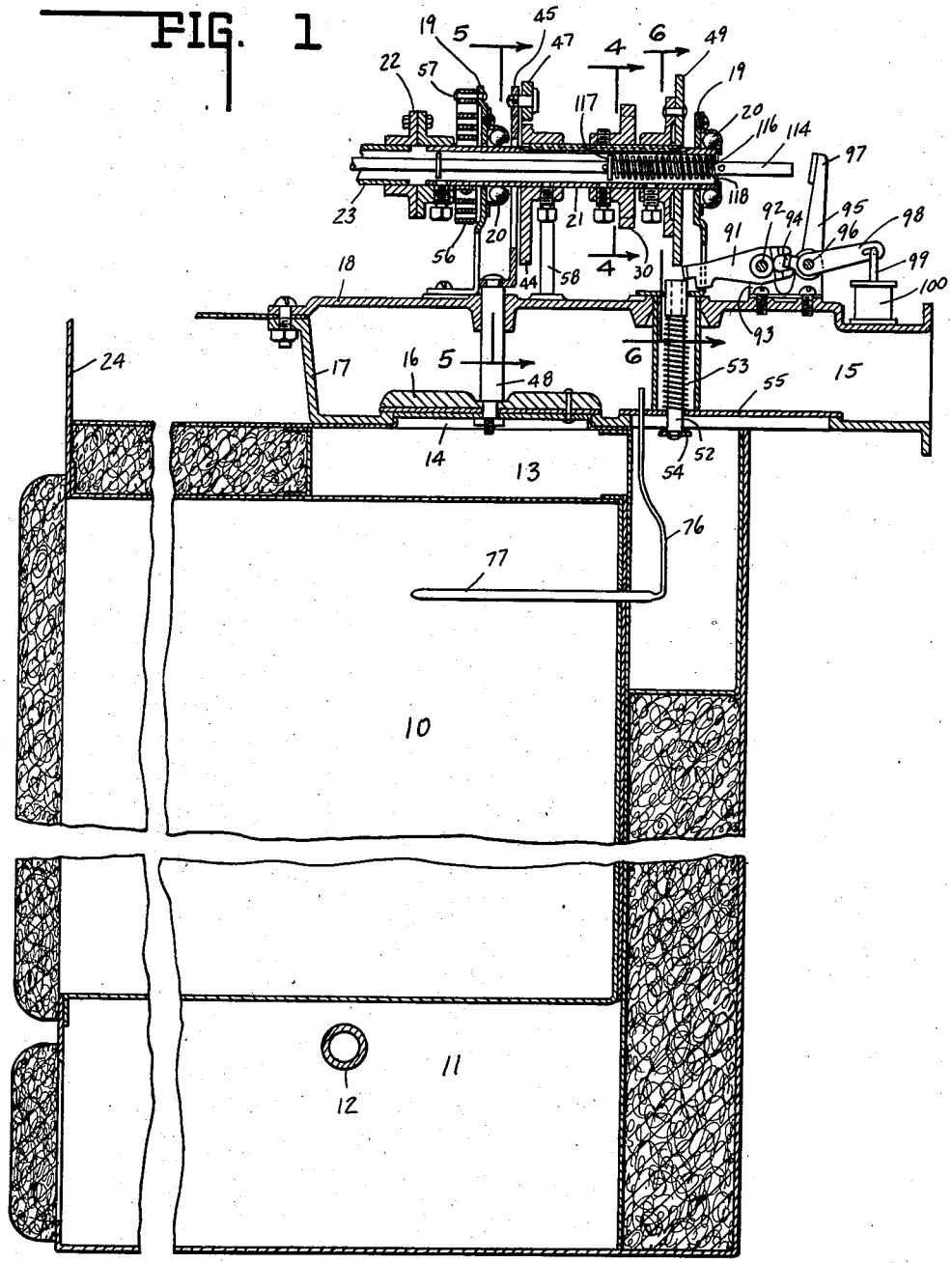
Figure 5:
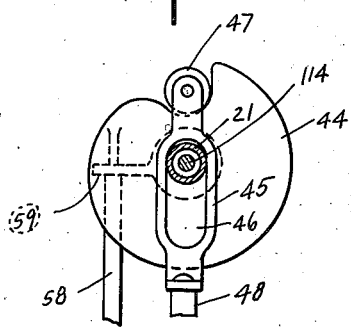
Figure 6:
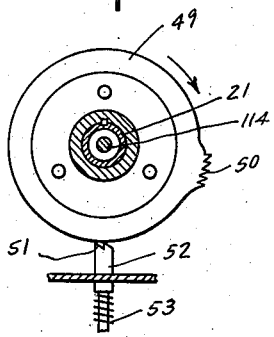
Figures 7, 8:
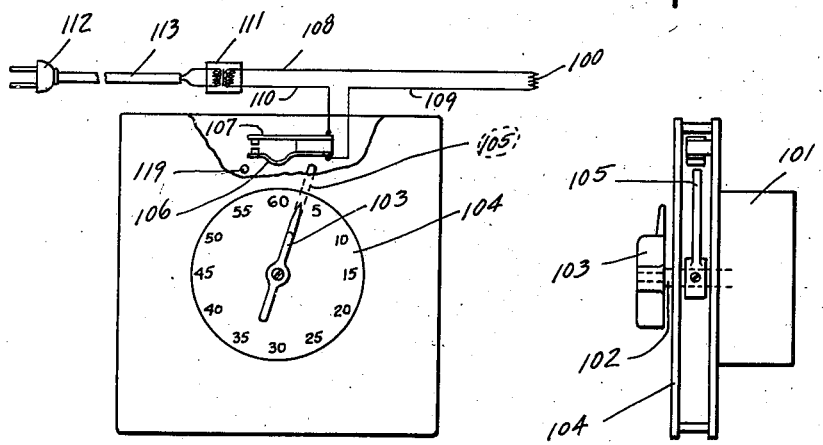

Fig. 1 is a vertical sectional view through an oven having the invention applied thereto in one of its preferred forms. Fig. 2 is a plan view of said control apparatus. Fig. 3 is an elevational view with parts cut away showing the portion of the control used by the operator in setting the same for various cooking conditions. Fig. 4 is a sectional view taken substantially on the lines 4—4 of Figs. 1 and 2. Fig. 5 is a similar sectional view taken on the lines 5—5 of Figs. 1 and 2. Figs. 6 is a similar view taken on the lines 6—6 of Figs. 1 and 2. Fig. 7 is an elevational view of the time control portion of the apparatus and Fig. 8 is a side view thereof.

In Fig. 1, there is shown, by way of illustration, a portion of a gas burning cook stove having an oven chamber 10 which is preferably of the type sealed from contact with the products of combustion, although the invention is equally applicable to the type of oven in which the products of combustion pass through the oven. Beneath the oven chamber there is a burner chamber 11 having a burner 12 of any desired form. The products of combustion pass upwardly about the sides of the oven to a chamber 13 above the same from which they may be discharged through a vent opening 14 to a passage 15 when a vent closure 16 is elevated. The passage 15 may be connected to a chimney or other suitable disposal apparatus.

The passage 15 is preferably formed by a pair of castings 17 and 18, the casting 17 containing the vent opening 14 and the casting 18 supporting the principal parts of the control apparatus. The casting 18 has secured thereto a pair of upright brackets 19 which carry ball bearings 20 rotatably supporting a tubular shaft 21. The shaft 21 is connected by means of a semi-flexible coupling 22 to a similar shaft 23 extending toward the front of the stove. The shaft 23 finds a bearing in the front plate 24 of the stove, as best seen in Fig. 2. Near the front end of the stove there is provided a collar 25 fixed to the shaft 23 and having an arm 26 to which there is fastened a pin 27 which terminates in a knob 28 extending through a slotted opening 29 in the front plate 24. By means of the knob 28 the shafts 23 and 21 may be rocked through a desired angle.

The shaft 21 has secured thereto a cam 30 adapted to engage a roller 31 secured to the end of a stud 32. The stud 32 is slidably mounted in a bushing 33 carried upon a bracket 34 in turn mounted upon the casting 18. A valve body 35 is likewise secured to the bracket 34, a flexible diaphragm 36 being interposed between the valve body and the bracket. A valve stem 37 is secured to the diaphragm 36 and abuts at one end against the stud 32, being retained in engagement therewith by a spring 38. The valve stem 37 carries a valve member 39 engaging a seat 40. An inlet pipe 41 for the valve 35 leads from any suitable fuel supply, such as a gas main, and the outlet pipe 42 thereof leads to a thermostatically controlled valve 43.

By means of the construction just described, the valve 35 may be opened by moving the knob 28 to the position indicated by "on" in Fig. 3, the cam 30 in this movement engaging the roller 31 to press the valve member 39 to the right in Fig. 4.

The shaft 21 also carries a cam 44 shaped as best seen in Fig. 5. A vertical slide 45 having an opening 46 straddling the shaft 21 carries a roller 47 engaging the surface of the cam 44. The lower end of the slide 45 is bent as shown in Fig. 1 and has secured thereto a vertical stem 48 upon which is mounted the vent closure 16. The cam 44 is in the position shown in Fig. 5 when the knob 28 is in the "off" position shown in Fig. 3. When the knob 28 is turned to the "on" position, the roller 47 rides on the edge of the cam 44 which is so shaped that the vent closure 16 is lifted from the vent opening 14 to permit circulation of the products of combustion.

The shaft 21 also carries a disc 49 having one or more projecting teeth 50 engageable with a similar tooth or teeth 51 on the upper end of a stem 52. The stem 52 is normally pressed upwardly by a spring 53 bringing the teeth into engagement with the surface of the disc 49. The upward movement of the stem 52 is limited by a washer 54 secured to the lower end thereof and engaging a plate 55 secured to the casting 17. When the knob 28 is in the "off" position shown in Fig. 3, the disc 49 is in the position shown in Fig. 6. When knob 28 is moved to the "on" position, the disc 49 is rotated to bring the teeth 50 into engagement with the teeth 51, thus retaining the shaft 21 in the "on" position until the stem 52 is depressed by means to be hereinafter described.

A flat coil spring 56 has one end secured to the shaft 21 and the other end secured by means of a screw 57 to the bracket 19. This spring is so arranged that it resists movement of the shaft 21 to the "on" position and serves to return said shaft to the "off" position when the stem 52 is depressed to release the teeth 50 and 51. In this return movement, the valve 35 and the vent opening 14 are automatically closed. The return movement is limited by a stop 58 mounted on the casting 18 and engaging a projection 59 formed on the rear surface of the cam 44. Thus the teeth 50 and 51 constitute a latch retaining the vent closure and valve 35 in the open position until stem 52 is depressed.

The thermostatic valve 43 receives its fuel supply from the valve 35 through pipe 42 and discharges to a pipe 60 which leads by any convenient route to the oven burner 12. The valve is provided with a by-pass 61 which supplies sufficient fuel to keep a minimum flame even though the valve itself is closed. The interior of the valve as shown in Fig. 2 is divided into two chambers 62 and 63 having a valve opening 64 therebetween which may be closed by a valve member 65 urged into closing position by a spring 66. A stem 67 abutting against the valve member 65 leads through a suitable opening in the valve body and engages a plate 68. The plate 68 is rigidly secured to a second plate 69 by means of bolts 70 and the plate 69 is threadedly engaged by a stem 71 abutting at its inner end against a thermostat bellows 72. The bellows 72 abuts at its opposite end against a stationary plate 73 secured to the valve body 43 by bolts 74. A compression spring 75 is interposed between the plates 73 and 68. The thermostat bellows has connected thereto the usual tube 76 leading to a thermostat bulb 77 (Fig. 1) which is placed in any convenient position within the oven.

The bulb 77 is filled with the usual volatile fluid which exerts increasing internal pressure within the bellows 72 with increasing temperature at the bulb 77. By this means, an increase of temperature in the oven expands the bellows 72, pressing the stem 71 and the plates 69 and 68 to the left in Fig. 2 against the action of the spring 75, thus releasing the stem 67 and permitting the spring 66 to close the valve. Similarly, a decrease of temperature in the oven permits the bellows to contract and the spring 75 then presses the plate 68 against the stem 67 and opens the valve. The pressure of the spring 75 determines the temperature at which the valve will be entirely closed and, what is equally important, it determines the amount of valve opening prior to reaching this temperature. With a given pressure on spring 75, the thermostatic valve is, therefore, operated to raise the temperature of the oven to a predetermined degree at a predetermined rate and to thereafter hold the oven at that temperature by repeated opening and closing of the valve until the fuel supply is shut off by the closure of valve 35.

In order to change the temperature for which the thermostat is set and the rate of temperature increase, it is only necessary to rotate the stem 71, thus increasing or decreasing the pressure on the bellows 72 and the spring 75. To accomplish this adjustment, there is provided a shaft 78 coupled to the stem 71 by means of a coupling 79 having a pin-and-slot connection 80 with the stem 71 which permits the stem to move longitudinally. The shaft 78 finds a bearing 81 in the front plate 70 of the stove and finds another bearing in a spacer 82 which extends between the shaft 23 and the shaft 78, both shafts being rotatable therein. A sprocket 83 is fixed to the shaft 78 and carries a chain 84 connected to a similar sprocket 85 rotatable on the shaft 23. The sprocket 85 is connected by means of a pin 86 to a knob 87, likewise rotatable on the shaft 23. The pin 86 passes through a suitable slotted opening in the front plate 24. The knob 87 is provided with graduations 88 registering with an arrow 89 or other index on the front plate to indicate the temperature at which it is desired to maintain the oven before the full supply is turned off. The spring 75 is so adjusted by means of lock nuts 90 that the thermostatic valve 43 will be operated to hold the desired temperature as indicated by these graduations when once this temperature has been reached.

For many purposes, the type of thermostat control described in detail above is not necessary. For example, a common form of snap action thermostat which alternately fully opens and closes its valve may be combined with a permanently burning pilot adjacent the oven burner to produce satisfactory results.

In order to trip the valve 35 and close the vent 16 when the desired temperature has been reached and maintained for the proper length of time, there is provided a lever 91 pivotally mounted at 92 upon a bracket 93 secured to the casting 18. One end of said lever is positioned to engage the upper end of the stem 52 to press the same downwardly. The opposite end of said lever is formed as a fork and engages one arm 94 of a three-arm bell crank lever 95. The last mentioned lever is pivotally mounted at 96 upon the bracket 93 and has an arm 97 extending upwardly and a third arm 98 extending outwardly as best shown in Fig. 1. The arm 98 is connected to the armature 99 of an electromagnet 100, which, when energized, pulls the arm 98 downwardly and presses the lever 91 against the upper end of the stem 52.

For actuation of the electromagnet 100, there is provided a timing apparatus shown in Figs. 7 and 8. This includes a clock 101 having a stem 102 on which there is mounted a pointer 103. The clock is of a commercial type in which the manual movement of the pointer 103 in a clockwise direction winds the clock and the clock then moves the pointer in a counterclockwise direction at a uniform rate. The clock is provided with a dial 104 having graduations thereon indicating time. In the operation of the clock, when the pointer is moved to the graduation indicating 10 minutes, for example, 10 minutes are required for the clock to return the pointer to the point indicated by the figure "60" on the dial. The clock used preferably is provided with the usual alarm device, giving an audible signal when the desired time has elapsed.

Behind the dial 104 there is mounted on the stem 102 an arm 105, preferably formed of insulation material and adapted to engage a curved contact member 106 when the pointer 103 returns to the vertical position at the point marked "60". When so engaged by the arm 105, the contact member 106 is pressed against a mating contact member 107 to close a circuit which energizes the electromagnet 100. This circuit is formed by conductors 108, 109 and 110 and receives power at a suitable low voltage from the secondary windings of a transformer 111. The primary windings of said transformer may be connected to the usual alternating current household supply by means of a plug 112 and cord 113.

In the operation of the oven, the clock pointer 103 is first set to the desired time for fuel supply and the knob 28 is then set in the "on" position to open the valve 35 and vent 16. The knob 87 is turned to bring the proper graduation opposite the index 89. The burner 12 is then lighted and the oven temperature will be raised at a predetermined rate to the temperature indicated by the index 89 and will be maintained at that temperature until the clock has returned the arm 105 to the vertical position. When this occurs, the contact member 106 is pressed upwardly to engage its mating contact, the electromagnet 100 is energized and the stem 52 pressed downwardly. The downward movement of stem 52 releases the latching teeth 50 and 51 and permits the spring 56 to close valve 35 and the vent closure 16. Thereafter the oven continues to cook on retained heat for an appreciable predetermined period, since all circulation of air or other gas around or through the oven is stopped by the vent closure.

In order to close the valve 35 and vent 16 manually, there is provided a stem 114 extending completely through the tubular shafts 21 and 23 and terminating in a button 115 inset in a recess in the knob 87. The stem 114 is normally pressed to the left in Fig. 1 by a compression spring 116 abutting against a washer 117 secured to said stem and against a washer 118 secured in the end of the tubular shaft 21. When the button 115 is manually pressed, the stem 114 engages the lever arm 97 and moves the lever 91 to trip the valve and vent closure in the same manner as done by the electromagnet 100.

In the operation of the clock 101, after the valve and vent have been closed, the pointer 103 continues to move counterclockwise until arm 105 strikes a stop 119 which prevents further movement of the clock. In this position the arm has passed the contact member 106 so that the electromagnet circuit is opened, thus conserving power and preventing overheating of the magnet. When in this position, the oven may be operated without time control of any kind, the valve 35 and vent closure 16 being manually operated when it is desired to shut off the fuel supply.

While the foregoing specification describes in detail a preferred form of the invention, the construction thereof may be varied by those skilled in the art without departing from the scope of the invention as defined in the appended claim. For example, the invention is not to be limited to gas stoves. It is equally applicable to stoves using other types of fuel and certain features thereof are applicable to electrically heated ovens. In the claim, the word "fuel" is intended to include electric current and the "lines" and "valves" include the equivalent conductors and switches for use with an electric heater.

The invention claimed is:

In combination, an oven, a burner for said oven and a fuel line to supply said burner, means forming a vent for products of combustion from said burner, a closure for said vent, a supply valve in said fuel line, a thermostat responsive to oven temperature to control said supply valve whereby a predetermined even oven temperature is maintained, a shut off valve in said supply line, a clock mechanism, and connections between said clock, said shut off valve and said vent closure, whereby said valve and vent are closed simultaneously by said clock.

ALDEN P. CHESTER.